United States Patent [19]

Arnold

[11] Patent Number: 5,405,477
[45] Date of Patent: Apr. 11, 1995

[54] MEANS AND METHOD OF ENCAPSULATING MECHANICALLY FASTENED BELT SPLICE FOR AGRICULTURAL BELT

[75] Inventor: Dale B. Arnold, Anthony, Kans.

[73] Assignee: Morrison Company, Inc., Anthony, Kans.

[21] Appl. No.: 232,762

[22] Filed: Apr. 25, 1994

Related U.S. Application Data

[62] Division of Ser. No. 66,995, May 24, 1993, Pat. No. 5,348,782.

[51] Int. Cl.⁶ ................... B32B 31/08; B32B 31/04
[52] U.S. Cl. ........................... 156/304.3; 156/304.5
[58] Field of Search ..................... 428/60, 61, 58; 156/304.3, 304.5

[56] References Cited

U.S. PATENT DOCUMENTS

| | | | |
|---|---|---|---|
| 676,565 | 6/1901 | Lindsay | 198/847 |
| 756,548 | 4/1904 | White | 198/847 |
| 975,560 | 11/1910 | Metzler | 198/847 |
| 1,698,035 | 1/1929 | Tobey | 198/847 |
| 1,781,750 | 11/1930 | Dodge et al. | 198/847 |
| 3,144,930 | 8/1964 | Michels | 198/847 |
| 3,546,054 | 12/1970 | Ross | 161/38 |
| 4,279,676 | 7/1981 | Morrison et al. | 156/159 |
| 4,371,580 | 2/1983 | Morrison et al. | 428/250 |
| 4,427,107 | 1/1984 | Roberts | 428/58 |
| 4,900,609 | 2/1990 | Arnold | 428/163 |

*Primary Examiner*—Alexander S. Thomas
*Attorney, Agent, or Firm*—Arnold, White & Durkee

[57] ABSTRACT

A means and method for encapsulating a mechanically spliced belt, used in agricultural machinery, are disclosed. The encapsulating material protects the mechanical splice from exposure to environmental and operational conditions. The encapsulating material increases the cross-sectional modulus of the mechanical splice while maintaining geometric integrity of the fastening system, thereby increasing the operational life of the spliced belt.

2 Claims, 2 Drawing Sheets

MEANS AND METHOD OF ENCAPSULATING MECHANICALLY FASTENED BELT SPLICE FOR AGRICULTURAL BELT

This application is a divisional of application Ser. No. 08/066,995, filed on May 24, 1993, now U.S. Pat. No. 5,348,782.

BACKGROUND OF THE INVENTION

1. Field of the Invention

This invention generally relates to mechanically fastened belt splices for agricultural machinery belts. The invention more particularly concerns mechanical splices which help to prolong the operational lives of the belts, and to methods of making such splices.

2. Description of the Prior Art

Belting is used today in many types of agricultural machinery, e.g., hay balers. A popular type of hay baler which is marketed today employs a plurality of belts which are used to form the hay into round bales. This type of baler is known as a round hay baler. The belts which are used on the round hay balers are typically in the order of 40 feet long and of the type described in commonly assigned patents U.S. Pat. No. 4,371,580 and U.S. Pat. No. 4,900,609, which are incorporated herein by reference.

There are several factors which must be taken into consideration when designing belting for hay balers. One factor is that when a hay baler is making bales, the belts are subjected to heavy loads. These loads cause the belts to stretch, and the amount that a belt stretches under the load must remain within a certain tolerance; otherwise, the bale it is making will become too large, thereby interfering with proper baler operation.

Manufacturers of hay balers have continued to increase the specification for the density of bales which a baler can produce. The amount of loading to which the belts of a baler are thereby subjected is increased, and hence the likelihood that a belt will stretch beyond tolerable limits for proper operation is increased. When a belt stretches beyond tolerable limits, the belt is generally removed and shortened. Shortening the belt is typically accomplished by trial and error techniques, especially in the fields. Such trial and error techniques are time consuming and can produce unsatisfactory results.

The two most common splices are vulcanized splices and mechanical splices. The underlying principle in vulcanized splicing is the establishment of adhesion between the components of the two belt ends being joined together in the splices. The goal is to develop adhesion in the splices equal to that in the original belt. In mechanical splices, the ends of the belt are connected by a mechanical device such as the "clipper splice" that is illustrated in FIG. 2.

Another factor to be considered in the design of belt splices is the ability of the belt to flex in operation without damaging the splice. In that regard, a typical round hay baler employs a plurality of rollers on which the belts are installed. The position of the rollers is such that the belts are subjected to a substantial amount of flexing in traveling around the rollers. Moreover, some of the rollers are positioned such that the belts must travel in an S-shape during operation. If a belt fails due to the flexing stress, the belt must be replaced to obtain proper operation of the baler. The typical failure point, particularly when mechanical splices are used, is at the point of splice.

Other factors when considering the type of splice to employ are cost and ease of installation. Although vulcanized splices are generally more durable than mechanical splices, they typically cost at least twice as much and they are much more difficult to install, particularly in the field.

Belts used in agricultural applications are most commonly fastened with mechanical splices. The mechanical splices, however, tend to deteriorate rapidly in operation and require substantial maintenance.

Belt slippage and mistracking are caused by a number of factors. In dry and dusty conditions, the dry crop and soil residue are deposited on the belt surfaces and roller surfaces. The residue acts as a lubricant causing both slippage and mistracking. In wet and slippery conditions, such as when baling wet hay or chopped silage, excess moisture also acts as a lubricant causing slippage and mistracking. Also, some crops, such as silage, leave a sticky residue on the belts which causes crop material to adhere to the belt surface. This causes the belts to react unevenly at the rollers, again causing slippage and mistracking. During slippage and mistracking, the belts may contact fixed guides, the belts may roll over, and adjacent belts may rub together. These occurrences damage the belt edges and the ends of the mechanical fasteners.

Mechanical methods have been employed in an effort to overcome the slippage and crop material collection problems, but with minimal success and often to the detriment of the mechanical fastening system. One such method has been to weld metal flighting, such as auger flighting, in a spiral configuration axially along a steel roller surface. The intent is for the flighting to scrape off crop material collecting on the belt surface. While the flighting does scrape the belt surface, it also scrapes the mechanical fastener. Many times the fastener is scraped from the belt.

Rigid and stationary belt dividers and guides are also employed to prevent mistracking. However, as the lateral edges of the belts contact the guides, the ends of the mechanical fasteners become damaged.

The combination of crop conditions, built-in metal or rubber rollers, belt guides and other components that physically scrape the belt all result in increased stresses and strains at the fastened area of the joined belt ends. Mechanical fasteners transfer these stresses and strains to the belt reinforcing fibers through the area of belt carcass penetration and by the member of the fastener that actually penetrates the belt carcass. There is a constant variable of stress and strain from one point to another point along the cross-sectional plane of the belt and the fastener area. There is also a belt-to-belt difference in multiple belted systems where the multiple belts are supported by the same long rollers. This is the case in the round hay baler.

The continuous high frequency oscillations of the stress/strain loads on the belt in operation are transferred to the points of the belt carcass penetrated by the mechanical fastener. Also, as the belt and the joined belt ends flex about the roller surfaces in a serpentine manner, this movement concentrates considerable stress/strain loads on the joined belt ends through the mechanical fastener due to the differences in belt surface elongations under dynamic loading. This makes it inevitable that the fastened cross-sectional plane of the belt ends can experience uneven stress/strain loads.

SUMMARY OF THE INVENTION

In accordance with the present invention, an encapsulated belt splice is provided which exhibits superior dimensional stability characteristics; which is not subject to deterioration due to operational and environmental conditions; which is able to flex in operation without destroying the mechanical fastener; and which is relatively inexpensive to produce. The encapsulated splice is particularly useful for belts that are used in hay balers and other agricultural equipment and that are spliced using mechanical fasteners.

In accordance with the present invention, the ends of a single- or multi-ply belt are spliced with a mechanical fastener, and the two opposed surfaces of the belt ends and the mechanical fastener are covered with a protective material. The protective material increases the cross-sectional area, and thus the strength, of the splice and protects the mechanical fastener from direct contact with the rollers or rigid belt scrapers.

In another embodiment of the invention, the protective material covers the outside edges of the belt ends, at the splice, and thus covers the two ends of the mechanical fastener. The protective material helps to prevent both the corners of the belt ends and the ends of the mechanical fastener from contacting either the rigid belt guides or adjacent belts.

In yet another embodiment of the present invention, the protective material bonds to the ends of the belt and to the mechanical fastener but does not bond to the shear connector, or clad pin, that is inserted through the mechanical fastener. This enables the protective material to protect the belt splice while enabling the splice to be more flexible as it passes over the rollers.

DESCRIPTION OF A PREFERRED EMBODIMENT

Figure 1:
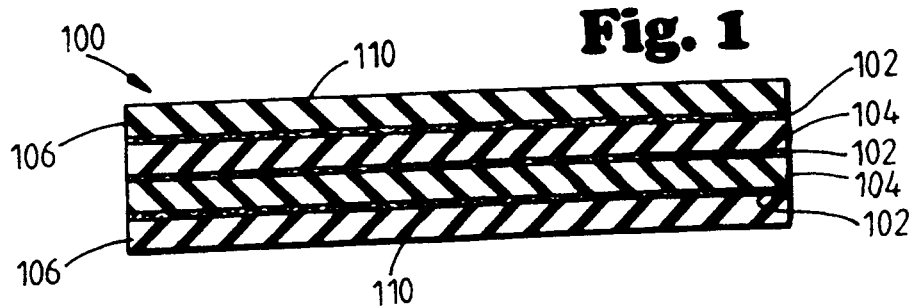
FIG. 1 is a cross-sectional view of a three-ply belting which is typical of belting commonly used in agricultural applications.

Before a preferred embodiment of the invention is explained in detail, it is to be understood that the invention is not limited in its application to the details of construction and the arrangement of the components set forth in the following description or illustrated in the drawings. The invention is capable of other embodiments and of being practiced or carried out in various ways. Also, it should be understood that the phraseology and terminology used herein is for the purpose of description and should not be regarded as limiting.

With reference to FIG. 1, the belting 100 includes one or more layers of ply material 102 interposed with layers of inner rubber skim 104. The belting also has two outer rubber skims 106, which provide opposed surfaces 110.

Figure 2:
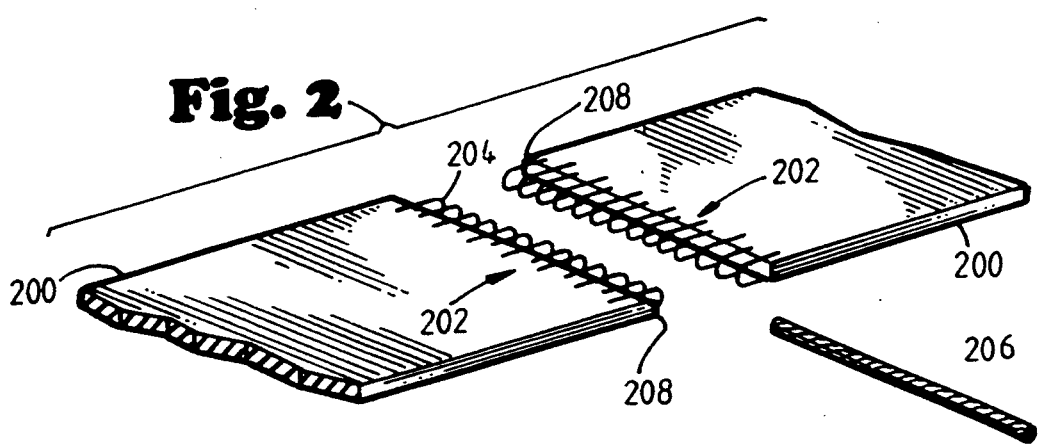
FIG. 2 is a perspective view of belting which illustrates a type of mechanical splice commonly used on belting in agricultural applications.
Figure 3:
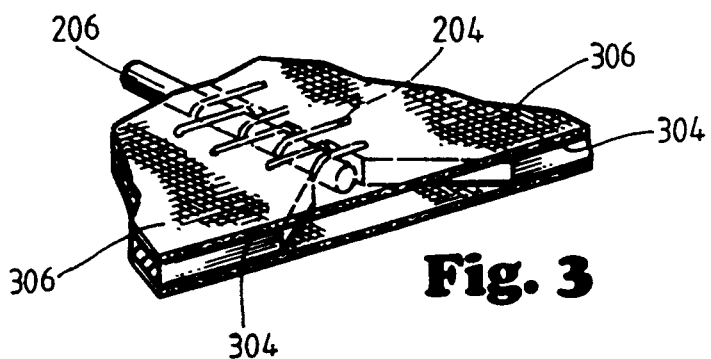
FIG. 3 is a perspective view of mechanically-spliced belting in which the corners of the ends of the spliced belts are removed.
Figure 5:
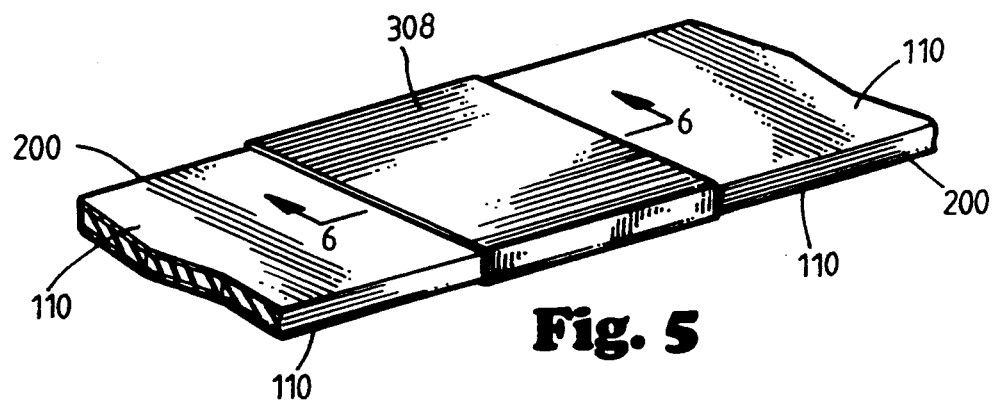
FIG. 5 is a perspective view of an encapsulated belt splice in accordance with the present invention.

With reference to FIG. 2, the belting comprises two opposed lateral edges 200 and two ends 202. The ends of the belting 202 may be spliced together by using known techniques. One such technique is illustrated in FIG. 2. It is known as the so-called "clipper lace" splice technique. With this technique, a plurality of metal eyelets or hooks 204 are connected in each end of the belting and a rod 206, or other suitable shear connector or clad pin, is passed through the eyelets. In one embodiment of the present invention, the corners 208 of the ends of the belting are notched to form a fillet between the ends of the belting 202 and the lateral edges 200, as illustrated in FIG. 3.

Figure 4:
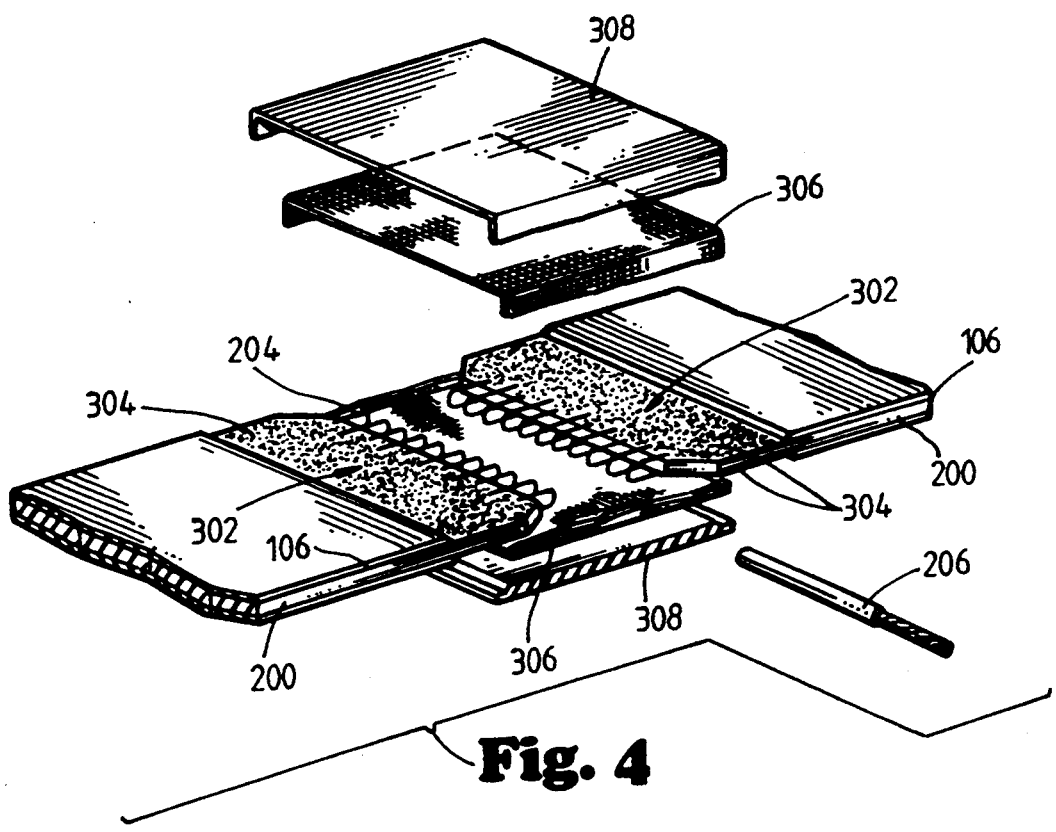
FIG. 4 is a perspective view partially exploded of an encapsulated belt splice in accordance with the present invention.
Figure 6:
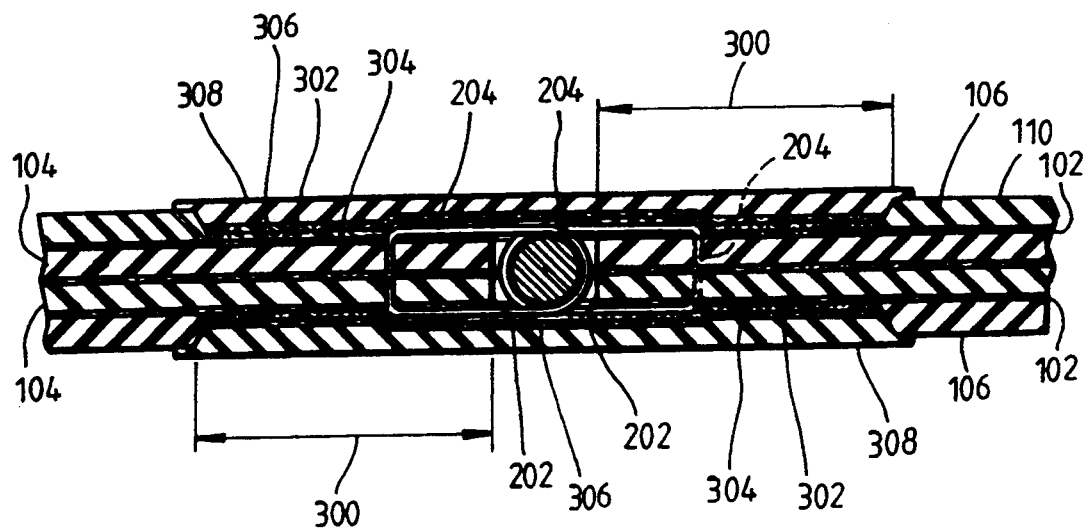
FIG. 6 is a cross-sectional view of an encapsulated belt splice in accordance with the present invention.

With reference to FIG. 4 and 6, in one embodiment of the present invention, the outer rubber skims 106 are skived, or removed, a distance 300 back from the ends of the belting 202. The skiving is performed such that the outer surfaces 302 of the outermost ply layers 102 are not damaged. The exposed surfaces 302 are cleaned with a nonresidue solvent, and a bonding cement of the type used to bond vulcanized rubber to a raw or unvulcanized gum is then applied to the exposed surfaces. After the cement is dry, a mechanical fastener of the type illustrated in FIGS. 2 and 3 that has been cleaned and coated with an adhesion agent, such as Lord Corp., Chemlok 205, is installed on the prepared belt ends.

A layer of bonding gum 304 is applied parallel to the splice such that the two prepared exposed surfaces and the two lateral edges of the two belt ends are covered by the gum. Next, a layer of reinforcing material 306, such as nylon netting or fabric, is applied such that it surrounds the previous layer of bonding gum. Finally, a layer of outside protective material 308, similar in composition to the outer rubber skims 106, is placed such that it surrounds the reinforcing material and gum layers. The protective material is then vulcanized or otherwise properly cured to form a protective sealant.

In another embodiment of the present invention, the clad pin 206 is treated with a lubricant or metallic bushing material such that neither the bonding gum 304 nor the protective material 308 adheres to the pin. Thus, after curing, the pin is free to rotate within the splice.

What is claimed is:

1. A method of splicing the ends of a belt which includes two opposed surfaces, two opposed lateral edges, a layer of ply material and a first layer of cover over the layer of ply material, said method comprising the following steps:

skiving the layer of cover at each end of the belt down to the layer of ply material;

attaching mechanical fasteners capable of being coupled together to the skived ends of the belt;

coupling the mechanical fasteners to form a mechanical splice;

encapsulating the skived ends of the belt including the mechanical fasteners and the opposed lateral edges of the skived ends with a protective material capable of bonding to the fasteners and the belt; and curing the protective material.

2. The method of claim 1 with the additional step of applying a reinforcing material to the skived ends of the belt, including the mechanical fasteners and the opposed lateral edges of the skived ends, before the skived ends are encapsulated with protective material.

* * * * *